United States Patent [19]

Nishimura et al.

[11] Patent Number: 4,966,033
[45] Date of Patent: Oct. 30, 1990

[54] AIR FLOW METERING APPARATUS FOR INTERNAL COMBUSTION ENGINES

[75] Inventors: Yutaka Nishimura; Minoru Ohsuga; Yoshishige Ohyama, all of Katsuta, Japan

[73] Assignee: Hitachi, Ltd., Tokyo, Japan

[21] Appl. No.: 365,552

[22] Filed: Jun. 13, 1989

[30] Foreign Application Priority Data

Jun. 15, 1988 [JP] Japan .................................. 63-145735
Jul. 9, 1988 [JP] Japan .................................. 63-170017
Aug. 26, 1988 [JP] Japan ........................... 63-111176[U]

[51] Int. Cl.⁵ ......................................... G01M 15/00
[52] U.S. Cl. .................................. 73/118.2; 73/204.14
[58] Field of Search ............... 73/118.2, 204.14, 117.3; 123/494

[56] References Cited

U.S. PATENT DOCUMENTS 4,297,881 11/1981 Sasayama et al. ................. 73/204.14

FOREIGN PATENT DOCUMENTS 110123 5/1987 Japan .

Primary Examiner—Jerry W. Myracle
Attorney, Agent, or Firm—Antonelli, Terry, Stout & Kraus

[57] ABSTRACT

Disclosed is an air flow metering apparatus for an internal combustion engine of the type in which heating current supply to a hot-wire air flow meter for detection of engine suction air flow rate is made intermittent in synchronism with the rotation of the engine so as to directly generate a flow rate detection signal in the form of a pulse width signal. The apparatus comprises a computing circuit for generating a correction data by using variables including the rotation period of the engine and the opening rate of a suction air flow control elements, whereby an air flow data obtained from the pulse width signal is corrected on the basis of the correction data.

19 Claims, 17 Drawing Sheets

AIR FLOW METERING APPARATUS FOR INTERNAL COMBUSTION ENGINES

BACKGROUND OF THE INVENTION

1. Field of the Invention

The present invention relates to an air flow metering apparatus for metering suction air flow rate in an internal combustion engine such as a gasoline engine, and, more particularly, relates to an air flow metering apparatus using a heat resistor.

2. Description of the Prior Art

To sufficiently realize a high engine performance and exhaust gas control in cars, a system for controlling engines by detecting suction air flow rate has been put into general practice. With the advance of the system, various kinds of air flow meters have been proposed. For example, a hot-wire air flow meter or sensor is one of the air flow meters now in general use.

In general, an electronic control apparatus for a car is mainly constituted by a micro-computer. It is therefore necessary that the detection signal of such an air flow meter or the like acting as an apparatus for generating an input signal for the control apparatus is taken into the control apparatus in the form of a digital signal after the detection signal has been subject to analog-to-digital conversion. Accordingly, it is desirable to design flow meters for cars so that the output signals thereof can be directly converted to digital signals. To this end, there has been disclosed an air flow meter, so to speak, a pulse-width modulation air flow meter, for example, in Japanese Patent Unexamined Publication No. 62-110123. In the so-called pulse-width modulation air flow meter, the supply of current to a hot wire is made intermittent in synchronism with the rotation of the engine so that the air flow rate can be directly converted into an output pulse-width signal by using the fact that the time required for heating the hot wire to a predetermined temperature is considered to be a predetermined function of air flow rate.

In the proposed air flow meter, however, lots of inherent problems exists.

A first problem is as follows. A predetermined high accuracy will be required for metering suction air flow rate in a car engine, in addition to consideration of the variations in apparatus resulting from the manufacture, the time aging, and the like.

However, the aforementioned prior art lacks consideration for the influence of pulsating suction air and the influence of thermal capacity of the hot-wire probe in the case where the rotation speed of the engine is relatively low and the load upon the engine is relatively heavy. There arises a problem in that a sufficiently high accuracy cannot be achieved.

A second problem is as follows. In the aforementioned prior art, the hot-wire heating period is directly represented by an air flow signal, so that the characteristics of the apparatus variously vary according to the rotation speed of the engine. Accordingly, all the various characteristics must be stored. There arises therefore a problem in that the required memory capacity increases greatly.

A third problem arises in the double points that the output signal expresses an oscillating waveform in the early stage of the stepping change of air flow rate and that the average amount of pulsating air flow rate is measured to be lower than the true amount. This is because the detection signal obtained through intermittent heating is proportional to the average of the heat transmission coefficient, not proportional to the average of the flow rate in the measurement period. In other words, the reason is that the average of the heat transmission coefficient $(A+B\sqrt{Q_a})$, not the average of the flow rate $Q_a$, is obtained (A and B being constants). Accordingly, errors increase as the amplitude ratio of the pulsating air flow rate increases.

SUMMARY OF THE INVENTION

A first object of the present invention is to provide a hot-wire air flow metering apparatus which is adapted for use in cars in which the amount of suction air flow rate always can be measured very reliably and accurately, thereby solving the aforementioned first problem.

A second object of the present invention is to provide an air flow metering apparatus having reduced memory capacity, thereby solving the aforementioned second problem.

A third object of the present invention is to provide an air flow metering apparatus in which the oscillation of the stepping response signal and the measurement error of pulsating air flow rate can be avoided, thereby solving the aforementioned third problem.

To attain the first object, according to a first aspect of the present invention, the apparatus is provided with means for generating a correction signal on the basis of the relation between the rotation speed of the engine and the opening of a suction air flow rate control means, such as a throttle valve, means for maintaining the reset state of a flip-flop for current intermittent current control, means for masking an ignition signal for the engine, and means for correcting the offset voltage of a comparator for judgment of the temperature of a hot-wire probe.

In general, pulsation of suction air increases, as the rotation speed of the engine decreases and the opening of the throttle valve increases. High accuracy can be obtained by correction on the basis of correction data given as a function of these values, that is, the rotation speed and the throttle valve opening. Further, an operation error can be eliminated by keeping the reset state of the flip-flop circuit securely or through masking of the ignition signal. Further, accuracy can be improved by correcting the offset voltage of the comparator. Accordingly, high accuracy and high reliability can be obtained.

To attain the second object, according to a second aspect of the present invention, a variable X, for example, $X=\sqrt{N}\cdot T - A/\sqrt{N}$ or $X=K\sqrt{N}\cdot T - K_2\cdot A/\sqrt{N} + K_3$ (in which A, $K_1$, $K_2$, and $K_3$ are constants, which is monistically or mono-meaningly determined on the basis of the heating period T of the hot wire and the rotation speed N of the engine as variables, is given so that a two-dimensional map of the variable X and a quantity of $Q_a/N$ which is expressed by a predetermined one-valued function of the variable X, that is, $F(X)=Q_a/N$, is formed and stored in advance, and then the quantity $Q_a/N$ for every heating cycle is obtained from the two-dimensional map by use of variable X calculated on the basis of the measured heating period T and rotation speed N of the engine, the thus obtained quantity $Q_a/N$ being produced as an output.

Because the two-dimensional map of the variable X and the quantity $Q_a/N$, which is formed as a predetermined one-valued function $F(X)=Q_a/N$ of the variable X monistically or mono-meaningly determined by the heating period T of the hot wire and the rotation speed N of the engine, is stored in a micro-computer in advance, the basic quantity $Q_a/N$ for every heating cycle can be directly calculated and outputted at a high speed by using the two-dimensional map expressing the function $F(X)=Q_a/N$ without using the rotation speed N of the engine as a parameter, after the variable X has been monistically or mono-meaningly obtained from the measured heating period T and rotation speed N of the engine.

To attain the third object, according to a third aspect of the present invention, the hot-wire probe is heated twice or more times for every air-intake stroke to obtain two or more measurement values (heating current supply period), and the measurement values are added after being converted into air quantities to thereby calculate the amount of suction air in every air-intake stroke so as to evade the vibration of the stepping response signal and the measurement error of the pulsating air flow rate.

BRIEF DESCRIPTION OF THE DRAWINGS

Other features and advantages of the present invention will be apparent from the following description when taken in connection with the accompanying drawings, wherein.

DESCRIPTION OF THE PREFERRED EMBODIMENTS

Referring to the accompanying drawings, embodiments of the present invention will be described in detail in connection with the above-mentioned objects of the invention, for the sake of understanding of the invention.

[As to the First Object]

First, the foregoing prior art will be described for the better understanding of the present invention.

Figure 17:
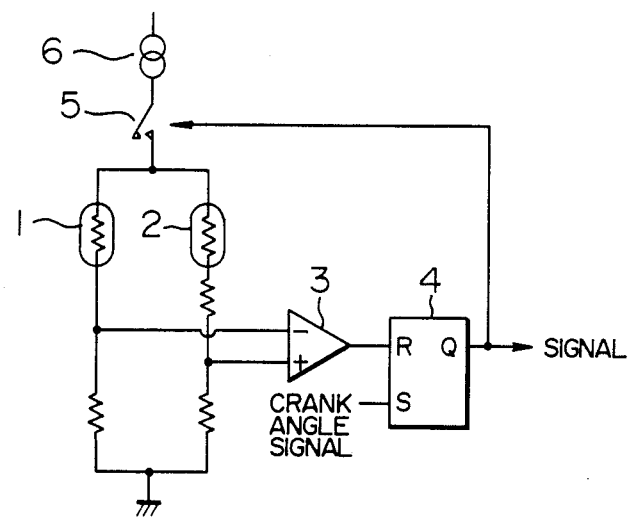
FIG. 17 is a block diagram showing a conventional hot-wire air flow meter.

Referring now to FIG. 17, a conventional air flow meter is shown. In FIG. 17, the conventional air flow meter is provided with a so-called hot wire or a hot-wire probe 1, a temperature-compensating resistor called a "cold wire" or a temperature probe 2, a comparator 3, a flip-flop circuit 4, a switch 5, and a constant-current regulated power supply 6.

The flip-flop circuit 4 has a set terminal for receiving a so-called crank angle signal generated for every predetermined engine rotation angle as the engine rotates. When the crank angle signal is received, the voltage level of an output Q terminal of the flip-flop circuit 4 becomes high. As the result, the switch 5 is turned on, so that a current from the constant-current regulated power supply 6 is fed to the hot wire 1. As a result, the temperature of the hot wire 1 rises so that the resistance thereof increases. When the temperature of the hot wire 1 reaches to a predetermined value, the output signal of the comparator 3 becomes high. This output signal is fed to the reset terminal of the flip-flop circuit 4, so that the voltage level of the output Q terminal of the flip-flop circuit 4 becomes low. As the result, the switch 5 is turned off, so that the current supply to the hot wire 1 is cut off. The cutting-off of the current supply to the hot wire 1 is continued until the set terminal of the flip-flop circuit receives a next crank signal. During the cutting-off of the current supply to the hot wire 1, the hot wire 1 is cooled by suction air flow.

In the case where the air flow rate is large, the degree of cooling of the hot wire 1 during the cutting-off of the heating current is intensified to prolong the next current supply period required for heating the hot wire 1 to the predetermined temperature.

Figure 18:
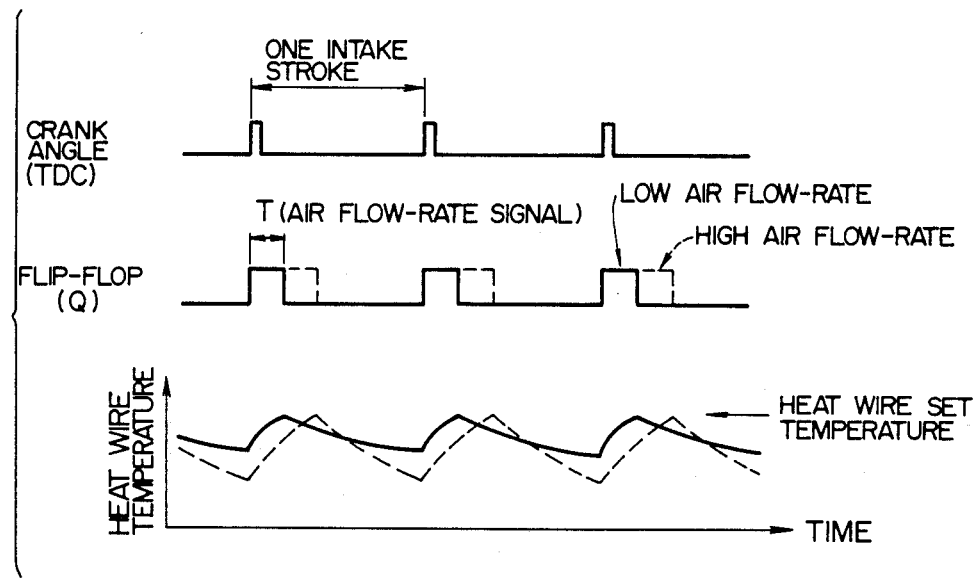
FIG. 18 is a view for explaining the principle of the operation of the hot-wire air flow meter.

Accordingly, the air flow rate $Q_a$ can be obtained as a function of the current supply period T and the crank angle signal period $T_0$, which corresponds to the reciprocal of the rotation speed N of the engine, as shown in FIG. 18.

As described above, a predetermined high accuracy will be required for metering the suction air flow rate in a car engine, in addition to a consideration of the variations in the apparatus, the time aging and the like.

However, the aforementioned prior art lacks consideration for the influence of the pulsating suction air and the influence of the heat capacity of the hot-wire probe in the case where the rotation speed of the engine is relatively small and the load upon the engine is relatively heavy. There arises a problem under such conditions in that a sufficiently high accuracy cannot be obtained.

In respect to the hot-wire probe used in this kind air flow meter, a relatively simple construction and good durability are required from the point of view of use in a car. To this end, use of hot-wire probes as shown in FIGS. 19 and 20 has been proposed heretofore.

Figure 19:
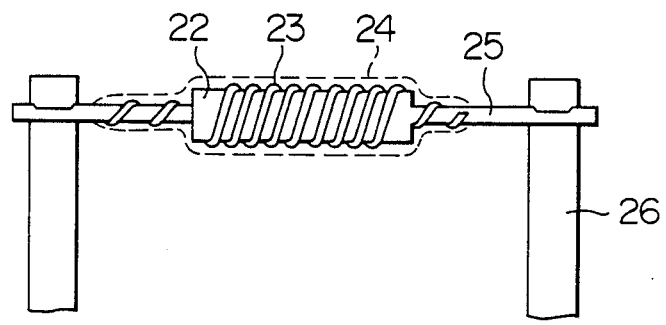
FIGS. 19 and 20 are views showing examples of construction of the hot-wire probe.
Figure 20:
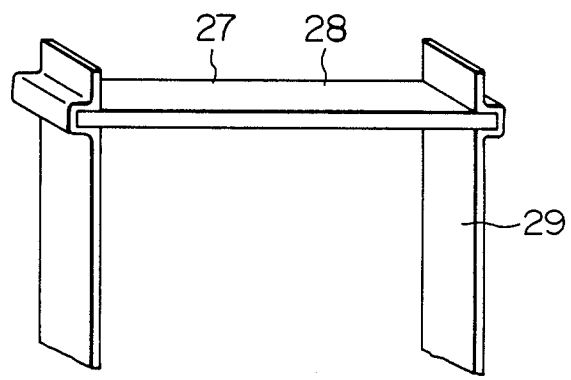

FIG. 19 shows an example of the construction of a hot-wire probe which has a ceramic cylinder 22 used as a bobbin, a fine platinum wire 23 wound thereon, a covering material 24 such as glass for covering the surface thereof, suitable lead wires 25, and supporting members 26 for supporting the ceramic bobbin 22 through the lead wires 25. FIG. 20 shows another example of the construction of the hot-wire probe which has a ceramic flat board 27, a film resistor 28 formed of a resistance material dependent on temperature and applied to the surface of the ceramic flat board by a thin-film or a thick-film technique, and supporting members 29 for supporting the ceramic flat board coated with the film resistor 28.

In use of either of the aforementioned hot-wire probes, the heat capacity thereof becomes very large, so that the temperature change which appears for an intermittent supply of current to the hot-wire probe becomes not so large. Accordingly, a high-accurate comparator is required for detection of the temperature change. This brings about an increase in cost. Further, the offset characteristic of the comparator may make it difficult to maintain a high accuracy.

To solve the aforementioned problem, the following arrangement is used in the present invention.

Figure 1:
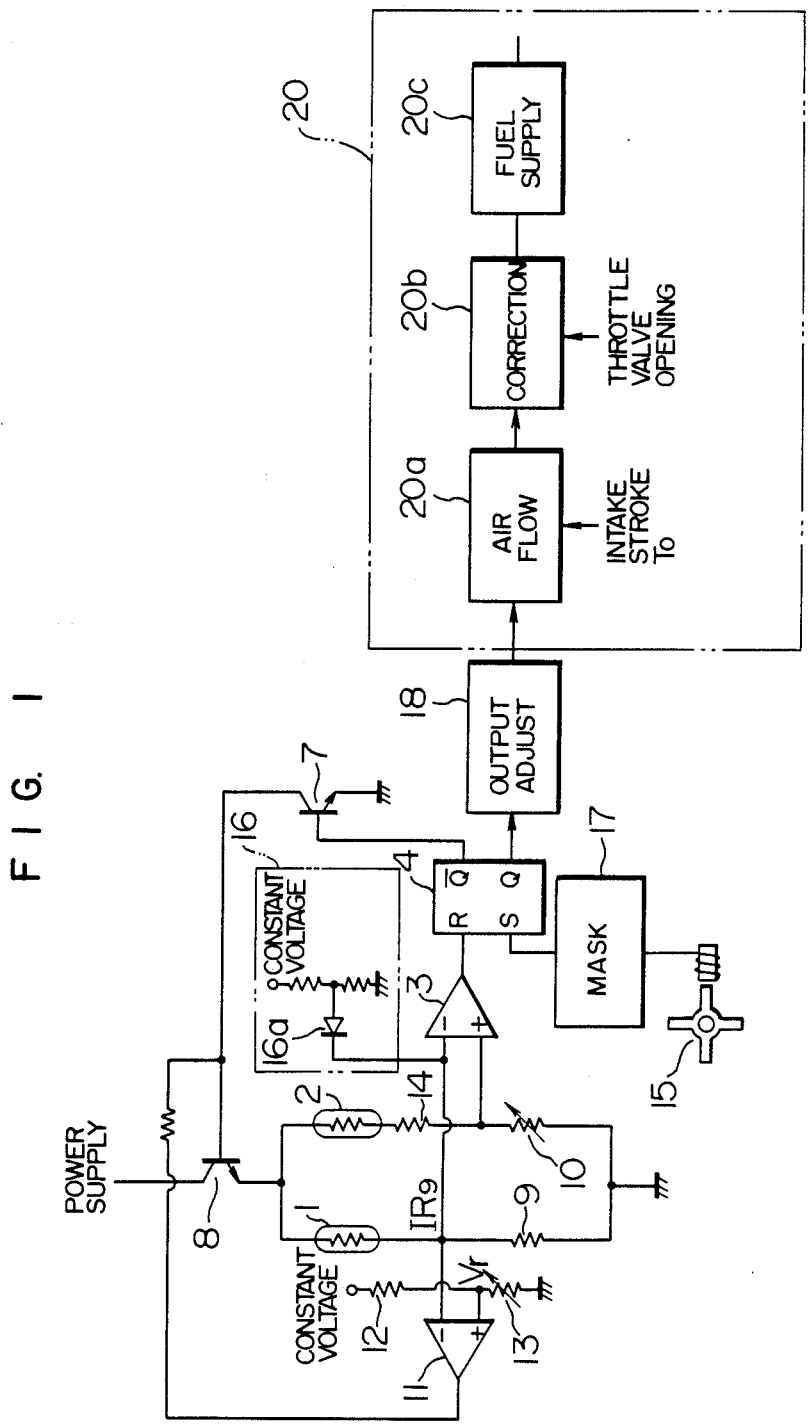
FIG. 1 is a block diagram showing an embodiment of the hot-wire air flow meter according to the present invention.

Referring to FIG. 1, an embodiment of the air flow meter according to the present invention is shown. In FIG. 1, the air flow meter is provided with a hot wire 1, a resistance wire 2, comparators 3 and 11, a flip-flop circuit 4, transistors 7 and 8, resistors 9, 10, 12 and 14, a variable resistor 13, a crank angle sensor 15, a starting power supply 16, a masking circuit 17, an output adjusting circuit 18, and a control micro-computer 20.

When the flip-flop circuit 4 is set on the basis of the signal from the crank angle sensor 15, the voltage level of the output $\overline{Q0}$ terminal of the flip-flop circuit 4 becomes low, so that the transistor 7 is turned off and the transistor 8 is turned on.

On the other hand, when the flip-flop 4 is reset by the output of the comparator 3, the output terminal Q becomes high, so that the transistor 7 is turned on and the transistor 8 is turned off.

As the result, the transistor 8 serves as the switch 5 in the prior art of FIG. 17, so that a pulse signal having a pulse width which is changing corresponding to the air flow rate $Q_a$ can be obtained from the output $\overline{Q0}$ terminal of the flip-flop circuit 4.

In the ON state of the transistor 8, the comparator 11 feeds a current to the base of the transistor 8. The comparator 11 compares a voltage drop $IR_9$ caused by the resistor 9 with a reference voltage $V_r$ given by dividing the voltage from the constant voltage regulated power supply through the resistors 12 and 13, so that the comparator 11 generates a current corresponding to the difference between $IR_9$ and $V_r$. As a result, the heating current I fed to the hot wire 1 from the power supply is regulated to a predetermined value determined by the reference voltage $V_r$. In short, a sufficiently regulated current I can be supplied to heat the hot wire 1.

As a matter of course, that available in the form of an individual device or element is employed as the comparator in such an apparatus. Accordingly, variations in characteristics for the various devices or elements cannot be avoided. As the result, even when the current supply is cut off, sometimes, the output voltage of the comparator 3 may become high because of variations in its input offset voltage or the like.

In the case where such an element or device is employed as the comparator, the output state of the comparator is never inverted though the set input of the flip-flop circuit 4 changes. As the result, no current is supplied to the hot wire 1, so that the operation of the flow meter cannot start. Accordingly, it is difficult to use the flow meter without some adjustment.

Therefore, the starting power supply circuit 16 is provided in this embodiment. The circuit 16 is constructed so that a fine electric potential is applied to the — (minus) input terminal of the comparator 3 through a diode 16a from a predetermined constant voltage regulated power supply. In short, an air flow meter which always securely operates under no adjustment can be provided easily.

The masking circuit 17 is provided to mask the ignition signal to thereby prevent operation errors due to noises from occurring. The detailed construction of the masking circuit 17 is shown in FIG. 2 in which the reference numeral 17a designates an electronic switch, and 17b designates a monostable multivibrator.

The electronic switch 17a is constituted by a digital switch formed by a combination of analog switches and logical circuits. The electronic switch 17a is connected so that the signal from the crank angle sensor 15 is fed to the set input terminal of the flip-flop circuit 4 through the electronic switch 17a.

The multivibrator 17b is triggered by the ignition signal, so as to be is reset with a predetermined time constant. In short, the multivibrator 17b serves to close the electronic switch 17a when it is triggered.

Figure 2:
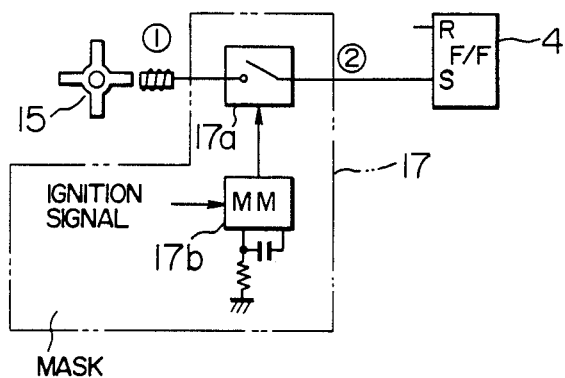
FIG. 2 is a detailed block diagram of a masking circuit.
Figure 3:
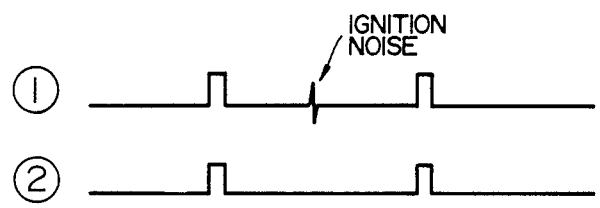
FIG. 3 is a view for explaining the operation of the masking circuit.

Even when an ignition noise is superposed on the signal from the crank angle sensor 15 as shown by the symbol ① in FIGS. 2 and 3, the OFF control of the electronic switch 17a during the period of occurrence of the ignition noise is carried out by the operation of the monostable multivibrator 17b, so that the ignition noise is masked as shown by the symbol ② in FIGS. 2 and 3, to make it possible to prevent operation errors from occuring.

In the aforementioned flow meter, gain adjustment and zero-point adjustment are required in order to make the heating current supply period for the hot wire 1, which becomes an air flow signal, agree with a predetermined characteristic.

The gain adjustment can be attained by trimming the resistor 13 to adjust the current to be supplied to the hot wire 1 or by trimming the resistor 10 to change the target temperature of the hot wire 1.

In this embodiment, the output adjusting circuit 18 is provided to perform a zero-point adjustment.

Figure 4:
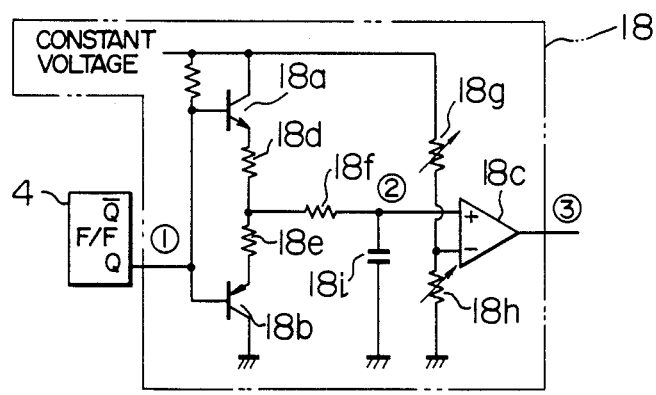
FIG. 4 a circuit diagram showing the detail of an output adjusting circuit.

FIG. 4 shows the detailed construction of the output adjusting circuit 18 which has two transistors 18a and 18b, a comparator 18c, three fixed resistors 18d to 18f, variable resistors 18g and 18h, and a capacitor 18i. The operation of the output adjusting circuit 18 will be described with reference to FIG. 5.

Figure 5:
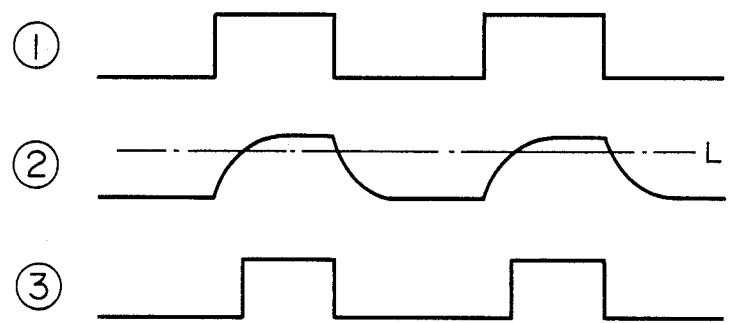
FIG. 5 is a view for explaining the operation of the output adjusting circuit.

The signal appearing at the output Q terminal of the flip-flop circuit 4 is as shown by the symbol ① in FIG. 5. The signal is processed by the transistors 18a and 18b, the resistors 18d to 18f and the capacitor 18g to thereby be converted into a waveform having time constants in the rise and fall periods thereof as shown by the symbol ② in FIG. 5.

The signal represented by the symbol ② in FIG. 5 is fed to the + (plus) input terminal of the comparator 18c in which the signal is compared with a predetermined level L set by the two variable resistors 18g and 18h. As a result, a signal having a waveform as shown by the symbol ③ in FIG. 5 can be obtained at the output terminal of the comparator 18c.

Accordingly, the pulse width of the signal obtained at the output terminal 3 of the comparator 18c can be adjusted by changing the electric potential level L of the − (minus) input terminal of the comparator by adjusting the variable resistors 18g and 18h. In short, a zero-point adjustment can be carried out by the output adjusting circuit 18.

Signal processing by the computer 20 will be described hereunder.

The output from the output adjusting circuit 18 is fed to an air flow computing means 20a. The processing executed by the computing means 20a involves a procedure for calculating the air quantity $IQ_a$ sucked into the cylinder during an air-intake stroke, on the basis of the heating current supply period T and the air-intake stroke period $T_0$. The details of the procedure will be described with reference to FIGS. 6 and 7.

Figure 6:
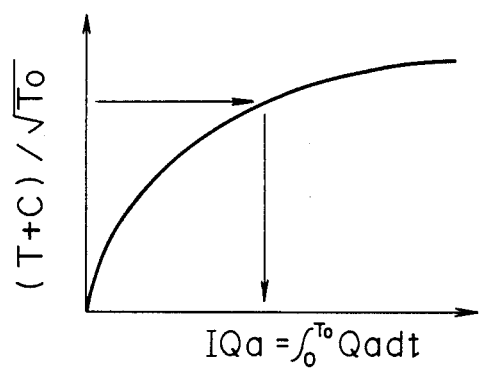
FIG. 6 a characteristic diagram of the air flow rate.

In general, the relations between the heating current supply period T, the air-intake stroke period $T_0$ (which is the reciprocal of the rotation speed of the engine) and the cylinder suction air quantity $IQ_a$ are as shown in FIG. 6, in the relationship along which C in the ordinate is a constant (inclusive of 0).

In this embodiment, the relations as shown in FIG. 6 are formed as a table, so that necessary data $IQ_a$ can be obtained by searching the table on the basis of the data T and $T_0$ and the constant C.

Figure 7:
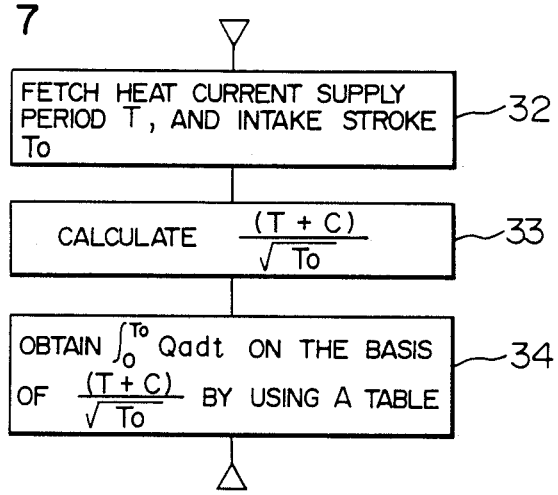
FIG. 7 is a flow chart showing an air flow rate calculating procedure.

FIG. 7 is a flow chart showing the steps of the procedure executed by the computing means 20a. When execution of the procedure starts, necessary data is fetched (step 32). Then an arithmetic operation necessary for searching the table of FIG. 6 is carried out (Step 33). Then the cylinder suction air quantity $IQ_a$ is obtained by searching the table (Step 34).

In the case where suction air is substantially constant, the air quantity can be measured with a sufficiently high accuracy. However, in the case where the suction air pulsates, a considerable error is produced resulting in a lower accuracy.

Therefore, the correction computing means 20b is provided in this embodiment to attain high accuracy at all times. The procedure executed by the correction computing means 20b will be described hereunder.

Figure 8:
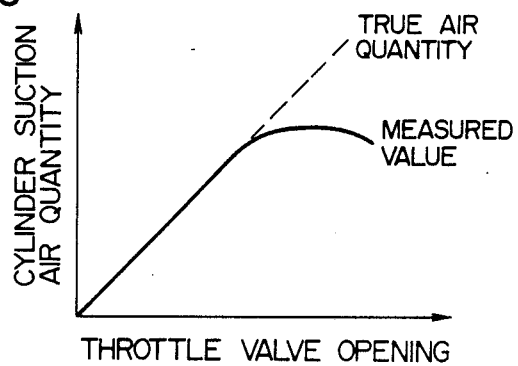
FIG. 8 is a characteristic diagram for explaining an air pulsating error.
Figure 9:
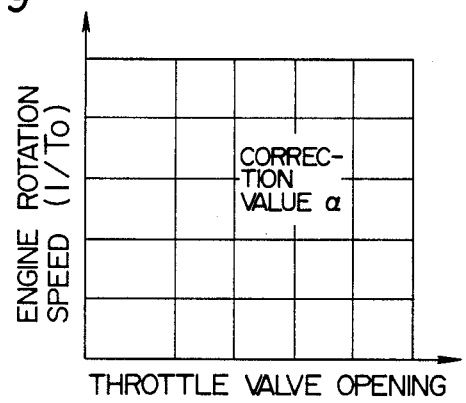
FIG. 9 a view for explaining a correction map.

An error caused by the pulsation of suction air is as shown in FIG. 8. As the opening of the throttle valve for controlling suction air flow rate decreases, the pulsation of suction air increases, and, accordingly, the measurement value of the air quantity decreases relative to the true value thererof. Therefore, a map as shown in FIG. 9 is provided in this embodiment. A correction value α is obtained by searching the map on the basis of the rotation speed N ($1/T_0$) of the engine and the opening of the throttle valve, so that the data $IQ_a$ is corrected on the basis of the correction value to thereby obtain the true value of the air quantity.

Figure 10:
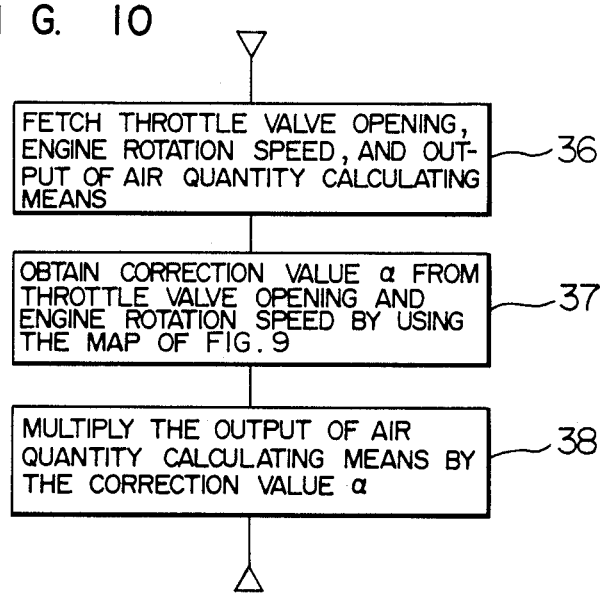
FIG. 10 is flow chart showing a correction procedure.

FIG. 10 is a flow chart showing the procedure executed by the correction computing means 20b. When the execution of the procedure starts, various necessary data for searching the map are fetched (step 36). Then a correction value α is obtained by searching the map of FIG. 9 (Step 37). Then the output signal of the computing means 20a is multiplied by the correction value α, and the correction procedure is terminated (Step 38).

Accordingly, in this embodiment, the suction air flow rate can be metered with high accuracy at all times regardless of the operation condition of the engine. In short, a high-accurate air-fuel ratio control can be attained. In FIG. 1, the reference numeral 20c designates a fuel supply quantity computing means for computing the amount of fuel supply for the air-fuel ratio control.

Although the above description involves classifiying the respective means 20a, 20b and 20d into blocks, it is to be understood that all the procedures by those means are executed by one computer 20.

Figure 11:
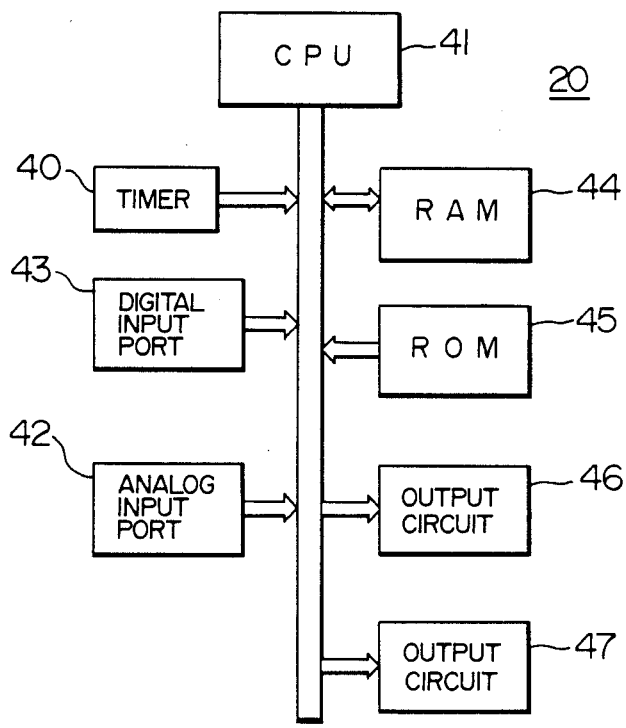
FIG. 11 is a block diagram of a computer.

FIG. 11 shows an example of the construction of the computer 20. The computer 20 has a CPU 41 which receives various input signals. Of those input signals, analog signals, such as a signal representing the cooling water temperature in the engine, a signal representing the opening of the throttle valve, and the like, are supplied to the CPU through an analog input port 42. On the other hand, pulse signals, such as a signal from the crank angle sensor 15 (for measuring the rotation speed of the engine), a signal from the output adjusting circuit 18, and the like, are supplied to the CPU through a digital input port 43.

The CPU 41 is a central processing unit for performing digital arithmetic operations. The CPU 41 is provided with an RAM 44 for temporarily storing data in the middle of an arithmetic operation and an ROM 45 for storing programs in advance, and operates to execute the aforementioned arithmetic operations. For example, output circuits 46 and 47 in FIG. 11 represent a fuel injection valve and an ignition device, respectively.

Figure 12:
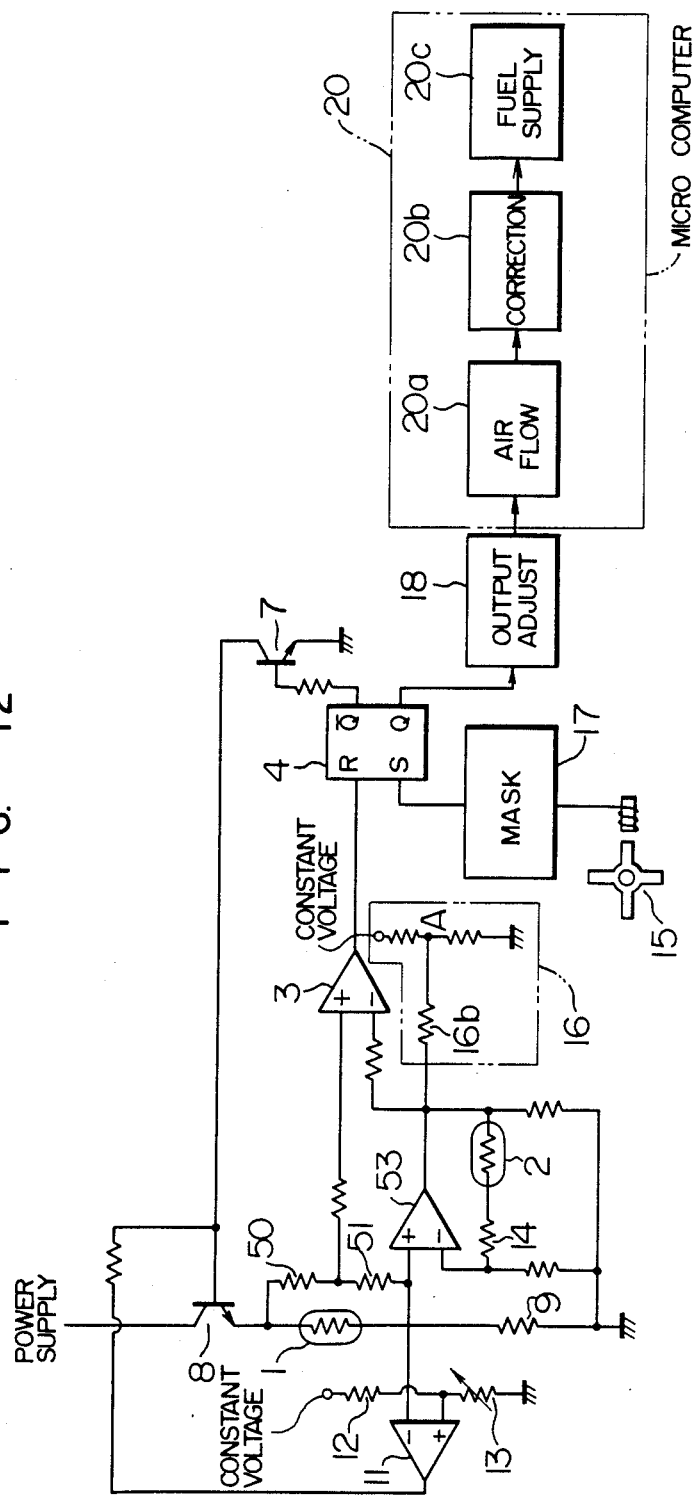
FIG. 12 is a block diagram showing another embodiment of the air flow meter according to the present invention.

FIG. 12 shows another embodiment of the present invention, in which the present invention is applied to a conventional hot-wire flow meter driving circuit which is disclosed in U.S. Pat. No. 4,297,881. In FIG. 12, an intermediate voltage obtained by dividing the voltage across the opposite ends of the hot wire 1 by resistors 50 and 51 is drawn out and, at the same time, the temperature-compensating resistor wire 2 is inserted into a feedback circuit of a second comparator 53. The output from the comparator 53 is connected to the − (minus) input terminal of the comparator 3.

In this embodiment, the current flowing in the resistor wire 2 can be reduced. As the result, the apparatus can be operated even in the case where the resistance of the resistor wire 2 is small. Accordingly, this embodiment has an advantage in that a material of the same form and the same resistance can be used commonly to both the hot wire 1 and the resistor wire 2.

Further, in this embodiment, the output impedance of the comparator 53 is very small. Accordingly, the starting power supply circuit 16 can be formed simply by connecting a predetermined electric potential point and the − (minus) input terminal of the comparator 3 through a resistor 16b. As a result, the diode 16a used in the embodiment as shown in FIG. 1 becomes useless.

Figure 13:
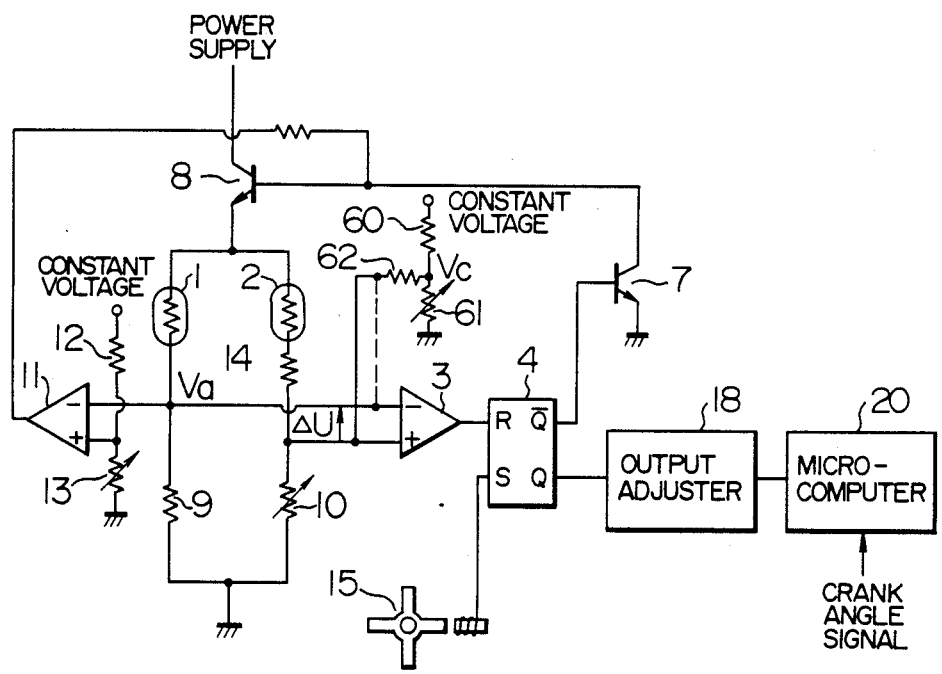
FIG. 13 is a block diagram showing a further embodiment according to the present invention.

FIG. 13 shows a further embodiment of the present invention, in which the input offset of the comparator 3 is adjusted.

As is well known, the comparator of the kind described above has an offset characteristic in the input thereof. As described above, that available in the form of an individual element or device must be used as it is as the comparator of the type described above. Accordingly, there are variations in characteristics of the individual comparator used. The offset voltage ΔU varies widely depending on the used individual comparator being used.

On the other hand, in this flow meter, the output signal of the comparator is changed over when voltages $V_a$ and $V_b$ as shown in FIG. 13 satisfy the following relation.

$$V_a + \Delta U = V_b$$

Accordingly, without any change, the accuracy of the flow meter will be lowered because of the offset voltage ΔU and, at the same time, the characteristic thereof will vary to make it impossible to maintain a high accuracy.

Further, the offset voltage ΔU depends on the temperature which also provides an adverse influence on the accuracy.

Therefore, a voltage setting circuit constituted by a resistor 60 and a variable resistor 61 is provided in this embodiment. A predetermined voltage $V_c$ set by this circuit is applied to the input terminal of the comparator 3 through the resistor 62 to thereby cancel the offset voltage ΔU. The polarity of the offset voltage ΔU may be inverted depending on the comparator being used. Therefore, it is necessary to change the connection as shown by the broken line of FIG. 13 in accordance with the polarity.

Accordingly, in this embodiment, the air flow rate can be metered with high accuracy at all times regardless of the comparator being used. In this case, the variable resistor 61 is trimmed while the output voltage of the comparator 3 is measured, in the actual case.

Figure 14:
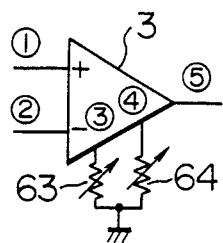
FIG. 14 is a view for explaining an example of an offset adjusting circuit.

Another example of the offset adjustment is shown in FIG. 14.

Figure 15:
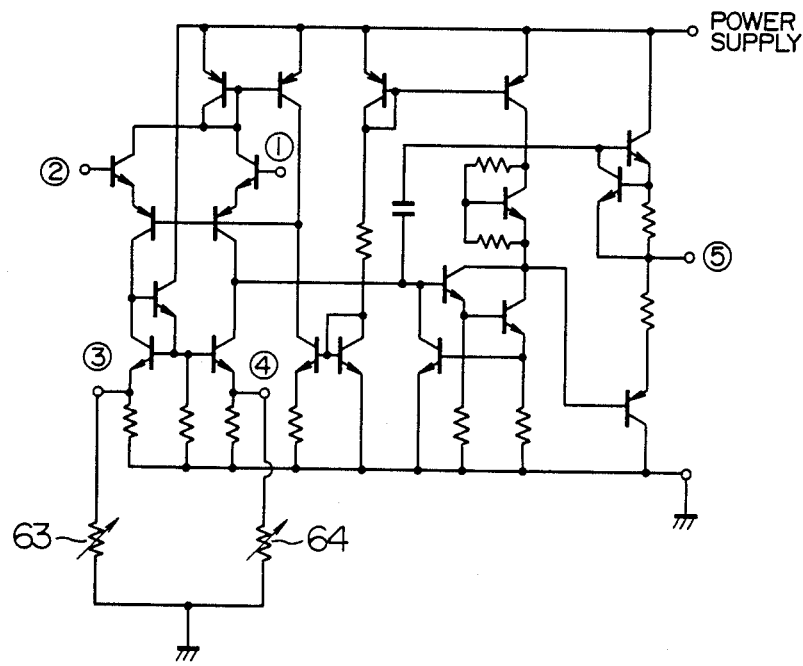
FIG. 15 is a detailed circuit diagram of the offset adjusting circuit.

In FIG. 14, a comparator 3 in the form of an operational amplifier is used. Because the circuit configuration of the operational amplifier is as shown in FIG. 15, the offset voltage can be canceled by connecting the variable resistors 63 and 64 respectively to the terminals 3 and 4 of the operational amplifier.

Figure 16:
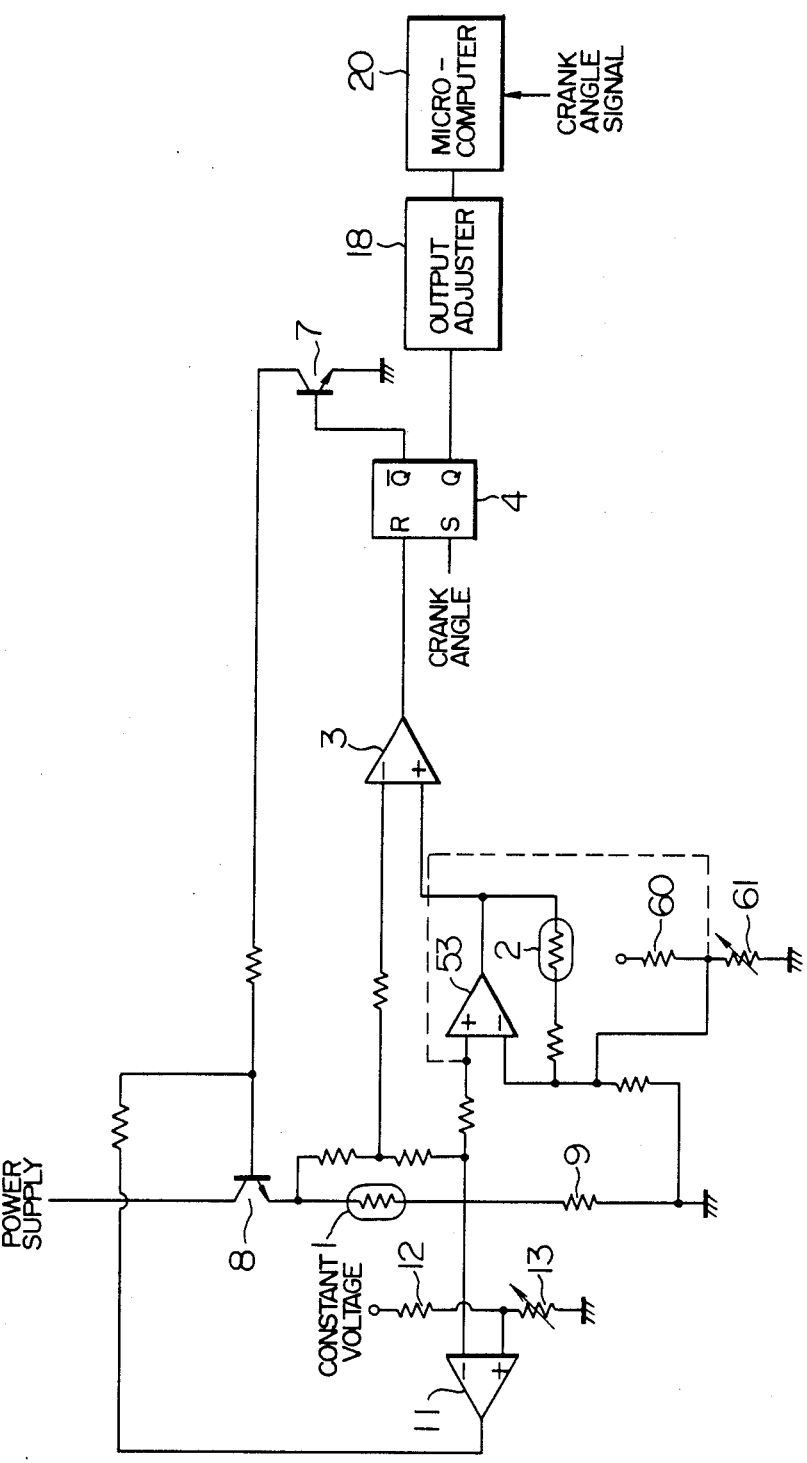
FIG 16 is a block diagram showing a further embodiment of the air flow meter according to the present invention.

FIG. 16 shows a further embodiment of the present invention, in which the offset voltage canceling method is applied to a flow meter using the second comparator as shown in FIG. 12. The total offset voltage of the comparators 53 and 3 is canceled by additionally providing resistors 60 and 61. In FIG. 16, the connection can be changed as shown by the broken line in accordance with the polarity of the total offset voltage. The offset voltage can be set to an optimum operation point by trimming the variable resistor 61 in the same manner as described above.

In this embodiment, a predetermined constant voltage may be applied to a selected one of the input terminals of the comparator 3. In this case, the comparator 3 is considered to be an operational amplifier having an infinite amplification factor. In such a configuration, the cancellation of the total offset voltage changes greatly though the constant voltage to be applied changes slightly.

In this embodiment, the amplification factor of the comparator 53 as an operational amplifier is suppressed to a considerably small value because the voltage for canceling the offset voltage is applied to the comparator 53. Accordingly, the response to the voltage change becomes slow, so that the offset adjustment can be carried out simply.

According to the aforementioned construction, exact air flow metering can be achieved while a required degree of accuracy is maintained regardless of the condition of use. Consequently, air-fuel ratio control for a car can be achieved with high accuracy at all times.

[As to the Second Object]

The prior art as shown in FIG. 17 lacks consideration about the method for calculating the basic quantity $Q_a/N$ for determining the fuel quantity supplied to the engine. In the prior art, the hot-wire heating period is detected and directly used as an air flow signal, so that variously different characteristics are produced depending on the rotation speed N of the engine, and all the different characteristic values must be stored. There arises therefore a problem in that the flow meter is complicated in construction.

To solve the aforementioned problem, the following construction is used in the present invention.

As shown in the prior art arrangement of FIGS. 17 and 18, the crank angle signal is fed to the set terminal of the flip-flop 4, so that the Q output of thereof is set to pass a current through the hot wire 1. As the result, the temperature of the hot wire 1 rises, so that the voltage of the hot wire 1 increases. When the voltage of the hot wire 1 reaches a predetermined value, the comparator 3 operates to feed a reset signal to the flip-flop circuit 4 to thereby reset the Q output, so that the heating of the hot wire 1 stops. As the result, the temperature of the hot wire is lowered, so that the voltage of the hot wire 1 decreases. The period in which the Q output is set, that is, the heating period T, has a value corresponding to the suction air flow rate and is represented by the equation $$I^2 R_w \frac{T}{T_0} = (C_1 + C_2 \sqrt{U})(T_w - T_a) \cdot S \quad (1)$$

in which I represents a current flowing in the hot wire, $R_w$ represents a resistance of the hot wire, $T_a$ represents the temperature of air, $T_w$ represents the temperature of the hot wire, S represents the surface area of the hot wire, $T_O$ represents a heating cycle, and T represents a heating period.

From the equation (1), the heating period T changes according to the value of $\sqrt{U}$. The heating period T changes in proportion to the temperature difference $(T_w - T_a)$ corresponding to the temperature $T_a$. Accordingly, it is preferable that the air temperature compensation relative to the voltage $V_h$ of the hot wire 6 is provided in the sensor output as follows.

Figure 21:
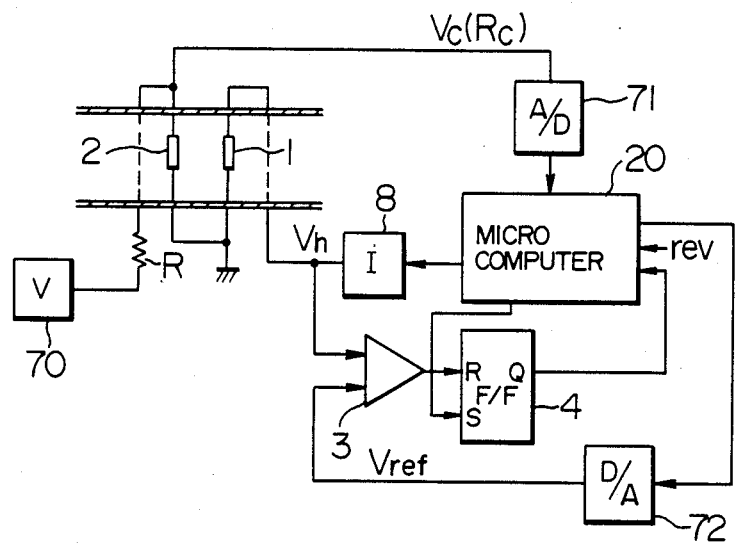
FIG. 21 is a block diagram of a hot-wire air flow meter with air temperature compensation.
Figure 22:
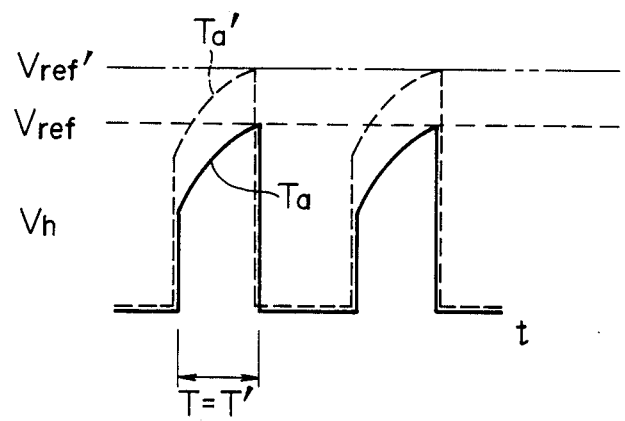
FIG. 22 is a characteristic diagram showing the operation thereof.

FIGS. 21 and 22 are a block diagram showing an example of construction of an air flow meter formed by adding temperature compensation of the sensor output to FIG. 17 and a graph showing the operation thereof, respectively. In FIG. 21, the reference numeral 2 designates a temperature-sensitive resistor for air temperature compensation, 70 designates an power supply V, 71 designates an A/D converter, and 72 designates a D/A converter. FIG. 22 is an operational waveform graph showing the voltage $V_h$ of the hot wire 1 under the air temperature compensation.

In FIG. 21, a constant voltage V obtained from the power supply 70 is supplied to the temperature-sensitive resistor 2 through a resistor R, separately from the current I supplied to the hot wire 1 from the driving circuit 8. A voltage $V_c$ determined by the resistance $R_c$ of the temperature-sensitive resistor 2 corresponding to the air temperature $T_a$ is converted, by the A/D converter 71, into a digital signal which is in turn supplied to the micro-computer 20. In the micro-computer 20, a predetermined value $V_{ref}$ is determined corresponding to the voltage $V_c$ (hence, corresponding to the resistance $R_c$) and converted, by the D/A converter 72, into an analog signal to be fed to the comparator. The operation after that is the same as described above with reference to FIG. 17. By compensation of the air temperature $T_a$, the predetermined value $V_{ref}$ changes corresponding to the air temperature $T_a$ as shown in FIG. 22. As the result, the hot wire heating period T does not change though the air temperature $T_a$ changes. In short, the predetermined value $V_{ref}$ increases to a value $V_{ref}'$ as the air temperature $T_a$ increases to a value $T_a'$ so that the heating period T becomes equal to a heating period T' to thereby avoid the influence of suction air temperature.

Here the following equations are established.

$$R_c = R_{c0}(1 + C_c T_a) \quad (2)$$

$$R_w = R_{w0}(1 + C_w T_w) \quad (3)$$

$$\therefore T_a = \frac{1}{C_c}\left(\frac{R_c}{R_{c0}} - 1\right) \quad (4)$$

$$T_w = \frac{1}{C_w}\left(\frac{R_w}{R_{w0}} - 1\right) \quad (5)$$

In those equations, $C_c$ represents the temperature coefficient of the temperature-sensitive resistor 2, $C_w$ represents the temperature coefficient of the hot wire 1, $R_{c0}$ represents the resistance of the temperature-sensitive resistor 2 at 0° C., $R_{w0}$ represents the resistance of the hot wire 1 at 0° C., $R_c$ represents the resistance of the temperature-sensitive resistor 2 at $T_a$° C. (that is, the air temperature), and $R_w$ represents the resistance of the hot wire 1 at $T_w$° C. Now the characteristics of the temperature-sensitive resistor 2 and the hot wire 1 are established as follows.

$$R_{c0} = R_{w0} = R_O$$

$$C_c = C_w = 2$$

Then the following equation is obtained from the equations (4) and (5).

$$T_w - T_a = \frac{1}{2R_0}(R_w - R_c) \quad (6)$$

Accordingly, the following equation is obtained from the equations (6) and (1).

$$I^2 R_w \frac{T}{T_0} = (C_1 + C_2\sqrt{U})\frac{1}{2R_0}(R_w - R_c) \cdot S$$

The equation can be rearranged as follows.

$$I^2 R_w \frac{T}{T_0} = (C_1 + C_2\sqrt{U})\frac{1}{2R_0}\left(1 - \frac{R_c}{R_w}\right) \cdot S \quad (7)$$

Assuming now that the current I is constant, that is 2, then the following functional equation is obtained because 2, $R_O$, S, $C_1$ and $C_2$ are invariables.

$$T = f\left(\sqrt{U}, \frac{R_c}{R_w}\right) \cdot T_0 \quad (8)$$

Accordingly, if the hot wire temperature $T_w$ is changed corresponding to the air temperature $T_a$ on the basis of the equations (2) and (3) so that the ratio of $R_c$ to $R_w$, that is, $R_c/R_w$, can be kept constant, the equation (8) can be rearranged as follows because $R_c/R_w$ is a constant.

$$T = f(\sqrt{U}) \cdot T_0 \quad (9)$$

The heating period T for the hot wire 1 becomes independent of the air temperature $T_a$ and the hot wire temperature $T_w$. The aforementioned operation can be executed by changing the hot wire temperature $T_w$ corresponding to the air temperature $T_a$. In short, from the point of view of the circuit, the aforementioned operation can be executed by changing the voltage $V_h$ of the hot wire 1 corresponding to the predetermined value $V_{ref}$ as shown in FIG. 22. The characteristics are stored in the micro-computer 20. Although the aforementioned method using the heating period T for the hot wire 1 directly as an air flow signal is a known method, the basic quantity $Q_a/N$ of injection obtained from the heating period as an air flow signal $Q_a$ by using the known method varies corresponding to the rotation speed N of the engine.

Figure 23:
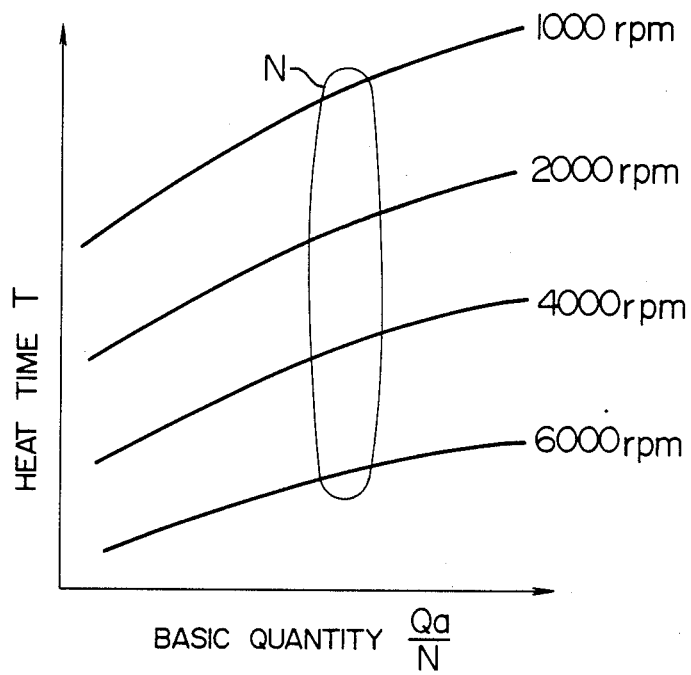
FIG. 23 is a characteristic diagram of a conventional three-dimensional map.

FIG. 23 is a characteristic diagram of a three-dimensional map for expressing the relation between the heating period T and the basic quantity $Q_a/N$ in the prior art. In FIG. 23, the basic quantity $Q_a/N$ (in which $Q_a$ is the average of air flow rate and N is the rotation speed of the engine) obtained directly from the equation (9) by using the period T for heating the hot wire 1 by the prior art suction air synchronization pulse driving method as an air flow signal $Q_a$ varies corresponding to the rotation speed N of the engine as shown in FIG. 23. In short, the basic quantity $Q_a/N$ can be expressed as a characteristic curve by using the rotation speed N of the engine as a parameter (for example, N=1000, 2000, 4000, 6000 rpm). Accordingly, the three-dimensional map of N and T is required for obtaining the basic quantity $Q_a/N$ from the heating period T. There arises a disadvantage in that the storage capacity of the micro-computer 20 must be enlarged to store the three-dimensional map therein. Here $Q_a/N$ is a basic quantity for determining the amount of fuel injection (that is, the valve opening period) supplied from the injector 9.

Therefore, according to the present invention, the three-dimensional characteristic in FIG. 23 is converted into a two-dimensional characteristic by the following method. The equation (1) is rearranged as follows.

$$I^2 R_w \frac{T}{T_0} = (C_1 + C_2 \sqrt{U}) \Delta T \cdot S \tag{10}$$

In the equation (10), $\Delta T = T_w - T_a$.

$$\therefore T = \frac{\Delta T \cdot S}{I^2 R_w} \cdot \frac{C_1 + C_2 U}{\frac{1}{T_0}} \tag{11}$$

In the equation (11), $$N = k_1 \frac{1}{t}$$

(in which $K_1$ is constant). Accordingly, the equation (11) is rearranged as follows.

$$T = k_1 \frac{\Delta T \cdot S}{I^2 R_w} \cdot \frac{C_1 + C_2 \sqrt{U}}{N} \tag{12}$$

$$\therefore \sqrt{N} \, T = k_1 \frac{\Delta T \cdot S}{I^2 R_w} \left( \frac{C_1}{\sqrt{N}} + C_2 \sqrt{\frac{U}{N}} \right) \tag{13}$$

In the equations, $U = k_2 Q_a$ (in which $k_2$ is constant). Accordingly, the equation (13) is rearranged as follows.

$$\sqrt{N} \cdot T = k_1 \frac{\Delta T \cdot S}{I^2 R_w} \left( \frac{C_1}{\sqrt{N}} + C_2 \sqrt{k_2} \sqrt{\frac{Q_a}{N}} \right) \tag{14}$$

If the current I and the rate $\Delta T/R_w$ (or $R/R_w$) are kept constant in the same manner as described above in the prior art, the equation (14) is rearranged into the following equation because S, $k_1$, $C_1$ and $C_2\sqrt{k_2}$ are constants.

$$\sqrt{N} \cdot T = \frac{A}{\sqrt{N}} + B \sqrt{\frac{Q_a}{N}} \tag{15}$$

in which $$A = k_1 \frac{\Delta T \cdot S}{I^2 R_w} \cdot C_1$$

$$B = k_1 \frac{\Delta T \cdot S}{I^2 R_w} \cdot C_2 \sqrt{k_2}$$

The following equation can be obtained by rearranging the equation (15).

$$B \cdot \sqrt{\frac{Q_a}{N}} = \sqrt{N} \cdot T - \frac{A}{\sqrt{N}} \tag{16}$$

$$\therefore \frac{Q_a}{N} = \frac{1}{B^2} \left( \sqrt{N} \cdot T - \frac{A}{\sqrt{N}} \right)^2 \tag{17}$$

In short, the following functional relation can be obtained.

$$\begin{aligned} \frac{Q_a}{N} &= F(T,N) \\ &= F\left( \sqrt{N} \cdot T - \frac{A}{\sqrt{N}} \right) \\ &= \frac{1}{B^2} \left( \sqrt{N} \cdot T - \frac{A}{\sqrt{N}} \right)^2 \end{aligned} \tag{18}$$

Accordingly, the basic quantity $Q_a/N$ can be obtained directly by calculating the right side of the equation (17) or (18) on the basis of the rotation speed N of the engine and the heating period T.

Figure 24:
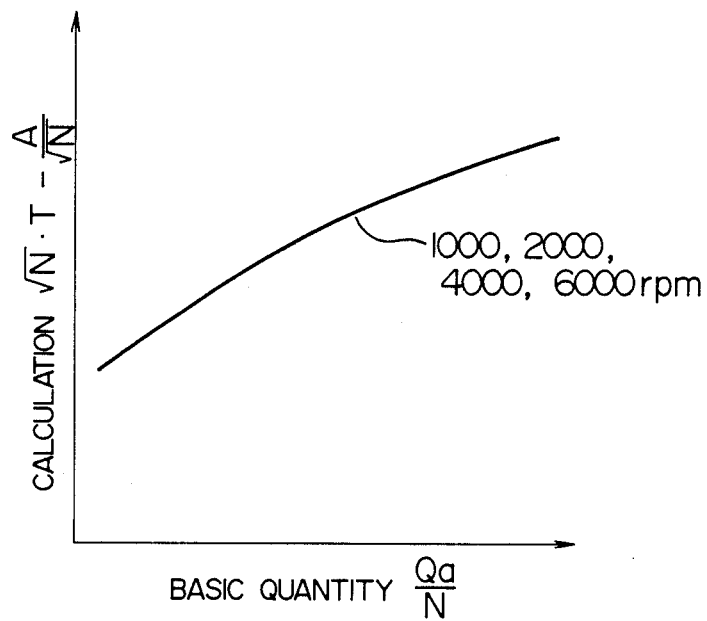
FIG. 24 is a characteristic diagram of a two-dimensional map.

FIG. 24 is a characteristic diagram of the two-dimensional map for expressing the functional relation between the variable $(\sqrt{N} \cdot T - A/\sqrt{N})$ including the heating period T and the rotation speed N of the engine and the basic quantity $Q_a/N$ according to one embodiment of the present invention. In FIG. 24, the characteristics of $(\sqrt{N} \cdot T - A/\sqrt{N})$ and $Q_a/N$ obtained by using the functional relation as represented by the equation (18) do not change though the rotation speed N of the engine changes successively to 1000, 2000, 4000 and 6000 rpm as shown in FIG. 24. Accordingly, the basic quantity $Q_a/N$ can be obtained easily from the heating period T for the hot wire 1 by using the two-dimensional map having the characteristic of FIG. 24. Accordingly, there arises an advantage in that the storage capacity of the micro-computer for storing the characteristic can be reduced.

Figure 25:
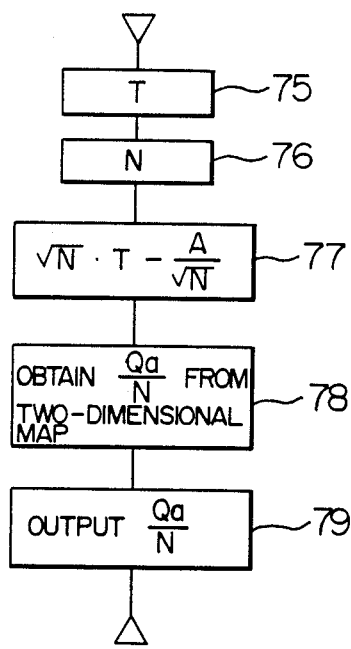
FIG. 25 is a flow chart showing a procedure for processing the two-dimensional map.

FIG. 25 is a flow chart showing the procedure for calculating, using the micro-computer 20, the basic quantity $Q_a/N$ from the heating period T for the hot wire by using the two-dimensional map of FIG. 24. The micro-computer 20 fetches the heating period T for every heating cycle of the hot wire 1 (Step 75) and then fetches the rotation speed N of the engine (Step 76). Then the micro-computer calculates $(\sqrt{N} \cdot T - A/\sqrt{N})$ (Step 77), calculates $Q_a/N$ from the two-dimensional map as shown in FIG. 24 (Step 78) and then sends out $Q_a/N$ (Step 79). The aforementioned procedure is carried out for every cycle, after every heating cycle of the hot wire 1 by suction air synchronization pulse driving is finished. Whenever the procedure is finished, the value of $Q_a/N$ is sent out soon. The amount of fuel injection from the injector 9 is determined on the basis of the basic quantity $Q_a/N$.

Further, correction coefficients and a correction term for correcting the scatter in characteristics may be added to the functional relation of FIG. 24 represented by the equation (18). In short, $Q_a/N$ can be represented by the equation $$\frac{Q_a}{N} = F\left( K_1 \sqrt{N} \cdot T - K_2 \frac{A}{\sqrt{N}} + K_3 \right) \tag{19}$$

In which $K_1$, $K_2$ and $K_3$ are constant.

According to the aforementioned construction, the basic quantity $Q_a/N$ can be obtained from the hot wire heating period T by using the two-dimensional map. Accordingly, the necessary capacity of the micro-computer can be reduced to about 1/20 as much as the capacity in the prior art, so that cost can be reduced. At the same time, the computing speed can be improved to accommodate the high-speed rotation of the engine.

[As to the Third Object]

According to the prior art as shown in FIG. 17, a problem arises in the following two points.

The first point is in that the output signal expresses a vibrating waveform at the early stage of stepping change of air flow rate.

The second point is in that the average amount of pulsating air flow rate is measured to be lower than the true amount. This is because the detection signal obtained by intermittent heating is proportional to the average of the heat transmission coefficient, not proportional to the average of the flow rate in the measurement period. In other words, the average of the heat transmission coefficient $(A+B\sqrt{Q_a})$, not the average of the flow rate $Q_a$, is obtained (A and B are invariables). Accordingly, errors increase as the amplitude ratio of the pulsating air flow rate increases.

To solve the aforementioned problem, the following construction is used in the present invention. The basic thought in the present invention is that the hot-wire probe is heated twice or more times in every air-intake stroke to obtain two or more measurement values (heating current supply period), the measurement values are added after being converted into air quantities, to calculate the amount of suction air in every air-intake stroke to thereby avoid the oscillation of the stepping answer signal and the measurement error of the pulsating air flow rate.

Figure 27:
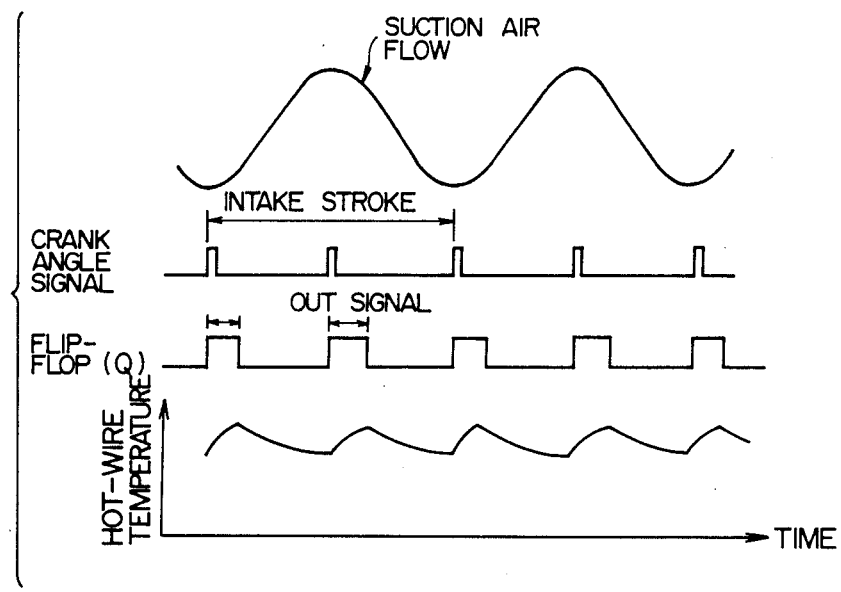
FIG. 27 is a view for explaining a method for measurement twice or more times for every air-intake stroke.
Figure 28:
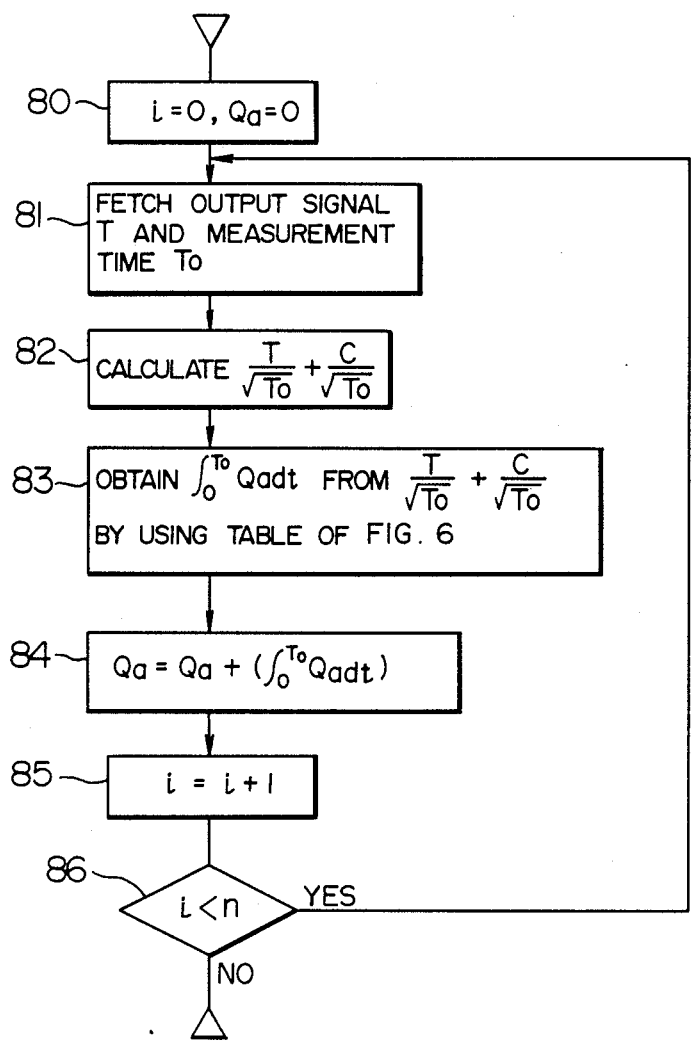
FIG. 28 is a flow chart showing a procedure for calculating the amount of air in the air-intake stroke.

FIG. 27 shows the case where the measurement is repeated twice in every air-intake stroke (at the crank angle of 180° in the case of 4-cylinder 4-cycle engine). A crank angle signal for every 90° is fed to the set terminal of the flip-flop circuit 4 to supply a heating current to the hot-wire probe 1. The periods (output signals) $T_1$ and $T_2$ required for heating the hot-wire probe to a predetermined temperature are measured. FIG. 28 is a flow chart showing the procedure for calculating the amount of air $Q_a$ dt in every air-intake stroke from the output signals $T_1$ and $T_2$.

Figure 26:
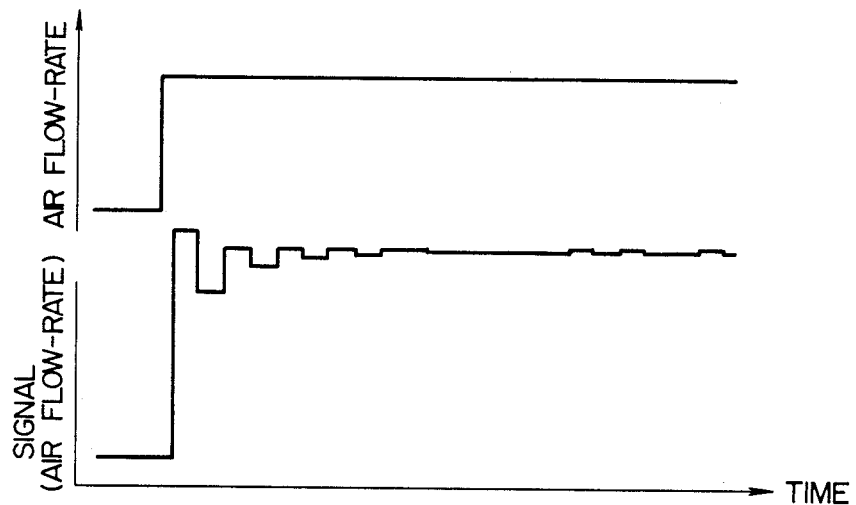
FIGS. 26 and 29 are characteristic diagrams the flow rate signal in the case where the amount of air is changed step by step.
Figure 29:
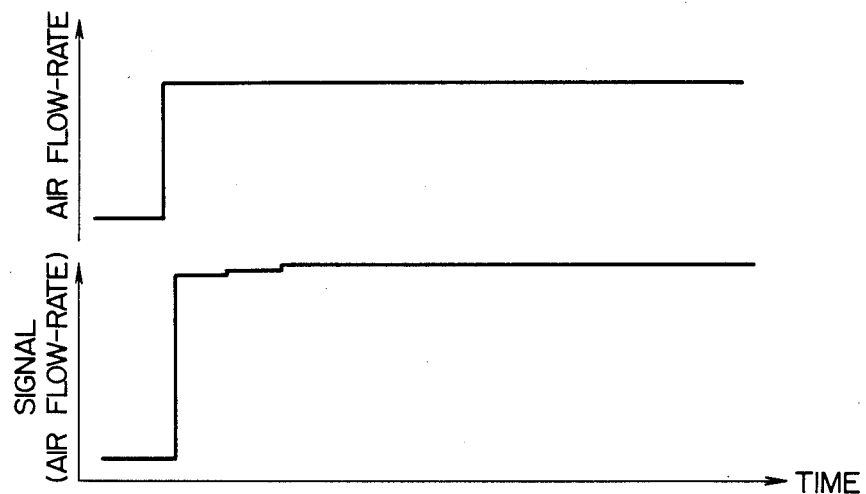

In Step 80, variables are initialized. In Step 81, the measurement period $T_O$ (period between crank angles) and the output signal T (heating current supply period) as shown in FIG. 27 are read. In Step 82, $T/\sqrt{T_O}=C/\sqrt{T_O}$ is calculated. In Step 83, $$\int_0^{T_0} Q_a dt$$

is obtained from $T/\sqrt{T_O}=C/\sqrt{T_O}$ by using the table of FIG. 6. In Step 84, $$\int_0^{T_0} Q_a dt$$

is added. In Steps 85 and 86, whether the number of arithmetic operations of $Q_a$ reaches a predetermined number or not is judged. When the number of arithmetic operations does not reach the predetermined value, the situation is returned to Step 81. When the number of the arithmetic operations reaches the predetermined value, $Q_a$ is determined to be the amount of suction air in the air-intake stroke. In short, the method comprises the steps of calculating the air quantity from the output signal T and the measurement period $T_O$ is repeated a predetermined number of times in every air-intake stroke, and the measured values of the air quantity are added to obtain the amount of suction air in every air-intake stroke. FIG. 29 shows the average of the signals as shown in FIG. 26. It is apparent from FIG. 29 that the amplitude of the signal is reduced.

Figure 30:
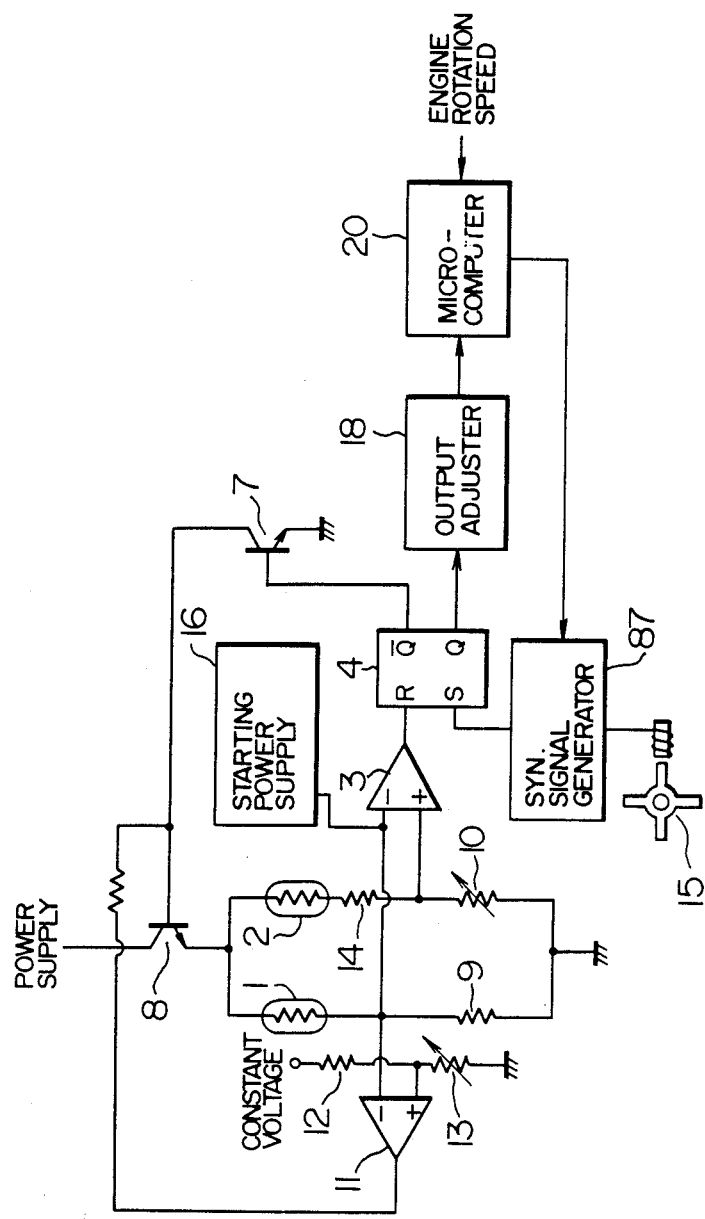
FIG. 30 is a view for explaining another method for measurement twice or more times for every air-intake stroke.

As described above, it is necessary to increase the number of measurements in every air-intake stroke for the double purpose of avoiding oscillation of the stepping response signal and reducing measurement errors due to pulsating flow rate. However, the output signal T (heating current supply period) is shortened to make it more difficult to measure the period T with high accuracy as the number of measurements increases. In particular, as the rotation speed of the engine becomes high, the period of one air-intake stroke is shortened and the output signal T is shortened. Therefore, it is necessary to change the number of measurements in one air-intake stroke corresponding to the rotation speed of the engine. An embodiment adapted to the change of the number of measurements is shown in FIG. 30. In this embodiment, a synchronization signal generator 87 is disposed between the crank angle sensor 15 and the set terminal of the flip-flop circuit 4 in FIG. 1. When the rotation speed of the engine is not lower than a predetermined value, a signal from the computer 20 is fed to the synchronization signal generator 87 to thin out signals of the crank angle sensor 15.

According to the aforementioned construction, oscillation of the air flow metering signal during the changing of air flow rate step by step can be avoided, so that the average amount of pulsating air flow rate can be measured with high accuracy. In particular, when the air flow meter according to the present invention is adapted to be used in a fuel injection apparatus for cars, the air-fuel ratio of the supply of mixed gas can be controlled with high accuracy in a wide operational range.

We claim:

1. In an air flow metering apparatus for an internal combustion engine in which heating current supplied to a hot-wire air flow meter for detection of engine suction air flow rate is made intermittent in synchronism with the rotation of said engine so as to directly generate a flow rate detection signal in the form of a pulse width signal, the improvement which comprises computing means for generating correction data using variables including the rotation period of said engine and the opening rate of a suction air flow control means, and means for correcting air flow data obtained from said pulse width signal on the basis of said correction data.

2. An air flow metering apparatus for an internal combustion engine according to claim 1, in which said apparatus further comprises a processing circuit for adjusting the pulse width of said pulse width signal to thereby correct the flow rate detection signal.

3. In an air flow metering apparatus for an internal combustion engine in which heating current supplied to the hot-wire probe of a hot-wire air flow meter for detection of engine suction air flow rate is made intermittent in synchronism with the rotation of said engine so as to directly generate a flow rate detection signal in the form of a pulse width signal, including a flip-flop circuit for controlling the intermittent supply of heating current to said hot-wire probe, the improvement which comprises level setting means for forcibly keeping at zero the logical level of a reset input terminal of said flip-flop circuit connected to receive an output of said hot-wire probe, while the current in said hot-wire probe is being cut off.

4. An air flow metering apparatus for an internal combustion engine according to claim 3, in which said apparatus further comprises a processing circuit for adjusting the pulse width of said pulse width signal to thereby correct the flow rate detection signal.

5. In an air flow metering apparatus for an internal combustion engine in which heating current supplied to the hot-wire probe of a hot-wire air flow meter for detection of engine suction air flow rate is made intermittent in synchronism with the rotation of said engine so as to directly generate a flow rate detection signal in the form of a pulse width signal, including a flip-flop circuit connected to receive an engine crank angle signal at its set input terminal for controlling the intermittent supply of heating current to said hot-wire probe, the improvement which comprises masking means responsive to an ignition timing of said engine for blocking transmission of said engine crank angle signal to said set input terminal of said flip-flop circuit when an ignition signal is generated.

6. An air flow metering apparatus for an internal combustion engine according to claim 5, in which said apparatus further comprises a processing circuit for adjusting the pulse width of said pulse width signal to thereby correct the flow rate detection signal.

7. In an air flow metering apparatus for an internal combustion engine in which heating current supplied to a hot-wire air flow meter for detection of engine suction air flow rate is made intermittent in synchronism with the rotation of said engine so as to directly generate a flow rate detection signal in the form of a pulse width signal, including a comparator for detecting the fact that the temperature of said hot-wire probe reaches a predetermined value while said hot-wire probe is being heated, the improvement which comprises voltage supply means for applying a predetermined voltage to said comparator to cancel an offset of said comparator.

8. An air flow metering apparatus for an internal combustion engine according to claim 7, in which said apparatus further comprises a processing circuit for adjusting the pulse width of said pulse width signal to thereby correct the flow rate detection signal.

9. An air flow metering apparatus for an internal combustion engine, comprising: a pulse-operated air flow meter including a hot wire probe to be provided in a suction pipe of said engine means for periodically supplying said hot wire probe with a current so as to be heated by suction-synchronized pulse driving corresponding to the rotation of said engine, including means for interrupting the heating current of said hot wire probe when the temperature of said hot wire reaches a predetermined value; means for measuring a suction air flow rate $Q_a$ for every heating cycle on the basis of an air flow signal representing a heating period T of said hot wire and; means for calculating a quantity $Q_a/N$ for every heating cycle on the basis of a predetermined one-valued function $F(X)=Q_a/N$ of a predetermined variable X which is monistically determined with variables consisting of said heating period T and a rotation speed N of said engine.

10. An air flow metering apparatus for an internal combustion engine according to claim 9, further including means for storing said function $F(X)=Q_a/N$ in the form of a two-dimensional map of the variable X and the quantity $Q_a/N$, whereby said calculating means includes means for calculating the variable X from a measured value of said heating period T and a measured value of said rotation speed of said engine, and means for calculating the quantity $Q_a/N$ from said two-dimensional map on the basis of the calculated value of said variable X.

11. An air flow metering apparatus for an internal combustion engine according to claim 10, in which the variable X is expressed by the equation $$X = \sqrt{N} \cdot T - A/\sqrt{N}$$

in which A is a constant.

12. An air flow metering apparatus for an internal combustion engine according to claim 10, in which the variable X is expressed by the equation $$X = K_1 \sqrt{N} \cdot T - K_2 \cdot A/\sqrt{N} + K_3$$

in which A, $K_1$, $K_2$ and $K_3$ are constants.

13. An air flow metering apparatus for an internal combustion engine according to claim 9, in which the variable X is expressed by the equation $$X = \sqrt{N} \cdot T - A/\sqrt{N}$$

in which A is a constant.

14. An air flow metering apparatus for an internal combustion engine according to claim 9, in which the variable X is expressed by the equation $$X = K_1 \sqrt{N} \cdot T - K_2 \cdot A/\sqrt{N} + K_3$$

in which A, $K_1$, $K_2$ and $K_3$ are constants.

15. An air flow metering apparatus for an internal combustion engine comprising:
a hot-wire probe to be provided in a suction pipe of said engine;
current supply means for supplying a heating current to said hot-wire probe at a predetermined crank angle twice or more times for every air-intake stroke of said engine;
detection means for detecting the fact that said hot-wire probe is heated to a predetermined temperature by said heating current;
means for cutting off the current supply to said hot-wire probe in response to a detection signal produced from said detection means;
means for generating an output signal corresponding to a period of the current supply to said hot-wire probe; and
means for calculating an air quantity per air-intake stroke on the basis of said output signal.

16. An air flow metering apparatus for an internal combustion engine, comprising:
a hot-wire probe to be provided in a suction pipe of said engine;

current supply means for supplying a heating current to said hot-wire probe;

detection means for detecting the fact that said hot-wire probe is heated to a predetermined temperature by said heating current;

means for cutting-off the current supply to said hot-wire probe in response to a detection signal produced from said detection means and a signal representing a predetermined crank angle of said engine;

means for generating an output signal corresponding to a period of the current supply to said hot-wire probe;

means for calculating an air quantity on the basis of said output signal;

wherein said calculating means includes means for generating correction data using variables including the rotation period of said engine and the opening rate of a suction air flow control means, and means for correcting air flow data obtained from said pulse width signal on the basis of said correction data.

17. An air flow metering apparatus for an internal combustion engine, comprising:

a hot-wire probe to be provided in a suction pipe of said engine;

current supply means for supplying a heating current to said hot-wire probe;

detection means for detecting the fact that said hot-wire probe is heated to a predetermined temperature by said heating current;

means for cutting-off the current supply to said hot-wire probe in response to a detection signal produced from said detection means and a signal representing a predetermined crank angle of said engine;

means for generating an output signal corresponding to a period of the current supply to said hot-wire probe;

means for calculating an air quantity on the basis of said output signal;

wherein said cutting-off means includes a flip-flop circuit for controlling said current supply means to effect intermittent supply of current to said hot-wire probe, said flip-flop circuit having a reset input terminal connected to said detections means and a set input terminal connected to said detection means and a set input terminal connected to receive said crank-angle signal, and further including level setting means for forcibly keeping at zero the logical level of said reset input terminal while the current supplied to said hot-wire probe is being cut-off.

18. An air flow metering apparatus for an internal combustion engine, comprising:

a hot-wire probe to be provided in a suction pipe of said engine;

current supply means for supplying a heating current to said hot-wire probe;

detection means for detecting the fact that said hot-wire probe is heated to a predetermined temperature by said heating current;

means for cutting-off the current supply to said hot-wire probe in response to a detection signal produced from said detection means and a signal representing a predetermined crank angle of said engine;

means for generating an output signal corresponding to a period of the current supply to said hot-wire probe;

means for calculating an air quantity on the basis of said output signal;

wherein said cutting-off means includes a flip-flop circuit for controlling said current supply means to effect intermittent supply of current to said hot-wire probe, said flip-flop circuit having a reset input terminal connected to said detection means and a set input terminal for receiving said crank angle signal, and further including masking means responsive to an ignition timing of said engine for blocking transmission of said engine crank angle signal to said set input terminal of said flip-flop circuit when an ignition signal is generated.

19. An air flow metering apparatus for an internal combustion engine, comprising:

a hot-wire probe to be provided in a suction pipe of said engine;

current supply means for supplying a heating current to said hot-wire probe;

detection means for detecting the fact that said hot-wire probe is heated to a predetermined temperature by said heating current;

means for cutting-off the current supply to said hot-wire probe in response to a detection signal produced from said detection means and a signal representing a predetermined crank angle of said engine;

means for generating an output signal corresponding to a period of the current supply to said hot-wire probe;

means for calculating an air quantity on the basis of said output signal;

wherein said detecting means includes a comparator, and further including voltage supply means for applying a predetermined voltage to said comparator to cancel an offset of said comparator.

* * * * *